United States Patent
Sang et al.

(10) Patent No.: US 12,365,143 B2
(45) Date of Patent: Jul. 22, 2025

(54) THREE-DIMENSIONAL (3D) PRINTING METHODS, SYSTEMS, AND DEVICES FOR TARGET OBJECTS

(71) Applicant: TAIYUAN UNIVERSITY OF TECHNOLOGY, Shanxi (CN)

(72) Inventors: Shengbo Sang, Taiyuan (CN); Jiahui Zhu, Taiyuan (CN); Aoqun Jian, Taiyuan (CN); Runfang Hao, Taiyuan (CN); Rihui Kang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/923,660

(22) Filed: Oct. 22, 2024

(65) Prior Publication Data
US 2025/0135725 A1    May 1, 2025

(30) Foreign Application Priority Data
Oct. 31, 2023    (CN) .......................... 202311429090.1

(51) Int. Cl.
*B29C 64/393*    (2017.01)
*B33Y 10/00*    (2015.01)
*B33Y 50/02*    (2015.01)

(52) U.S. Cl.
CPC .............. *B29C 64/393* (2017.08); *B33Y 10/00* (2014.12); *B33Y 50/02* (2014.12)

(58) Field of Classification Search
CPC ........ B29C 64/393; B33Y 10/00; B33Y 50/02
(Continued)

(56) References Cited

U.S. PATENT DOCUMENTS

2015/0034007 A1*  2/2015  Fischer ................. B29C 64/129
                                                 118/620
2015/0205553 A1*  7/2015  Kobayashi ............ G06F 3/1256
                                                 358/1.15
(Continued)

FOREIGN PATENT DOCUMENTS

CN        105184855 A       12/2015
CN        111391327 A        7/2020
(Continued)

OTHER PUBLICATIONS

Notification to Grant Patent Right for Invention in Chinese Application No. 202311429090.1 mailed on Nov. 25, 2024, 2 pages.
(Continued)

*Primary Examiner* — Mohammad Ali
*Assistant Examiner* — Joshua T Sanders
(74) *Attorney, Agent, or Firm* — Porus IP LLC

(57) ABSTRACT

Embodiments of the present disclosure provide three-dimensional (3D) printing methods, systems, and devices for target objects, and relate to a field of image data processing technology. The method includes performing a layering process to a 3D model of a target object and designing a printing path sequence, after each layer of the print is completed, according to a current layer 3D model and point cloud data of a single-layer 3D model corresponding to the current layer 3D model, performing the inspection of a height difference, a horizontal dimension difference and a void region in the printing, and according to the inspection result, performing timely feedback and adjustment, which can not only improve the professionalism, stability and efficiency of the printing, but also improve the similarity between the printed physical object and the target object, resulting in achieving a more accurate 3D printing.

8 Claims, 4 Drawing Sheets

(58) Field of Classification Search
USPC .......................................................... 700/98
See application file for complete search history.

(56) References Cited

U.S. PATENT DOCUMENTS

2017/0084080 A1* 3/2017 Huang .................... G06T 17/30
2020/0142384 A1* 5/2020 Bressler ................. B33Y 50/00

FOREIGN PATENT DOCUMENTS

| CN | 111639626 A | 9/2020 |
| CN | 114043728 A | 2/2022 |
| CN | 115816834 A | 3/2023 |
| CN | 115891174 A | 4/2023 |
| CN | 116373304 A | 7/2023 |
| CN | 116638766 A | 8/2023 |
| KR | 102266131 B1 | 6/2021 |

OTHER PUBLICATIONS

First Office Action in Chinese Application No. 202311429090.1 mailed on Nov. 13, 2024, 18 pages.

* cited by examiner

200

```
┌─────────────────────────────────────────────────────────┐
│ obtaining a 3D model of a target object, determining a  │
│ printing path sequence and a multilayer 3D model based  │
│ on the 3D model of the target object                    │
└─────────────────────────────────────────────────────────┘  ~ 210
                          ↓
┌─────────────────────────────────────────────────────────┐
│ obtaining a height difference between a current layer   │
│ 3D model and a single-layer 3D model corresponding to   │
│ the current layer 3D model, based on a current layer    │
│ sequence of the printing path sequence after completing │
│ printing of a current layer, and determining whether    │
│ the height difference exceeds a first threshold;        │
│ in response to determining that the height difference   │
│ exceeds the first threshold, stopping printing          │
└─────────────────────────────────────────────────────────┘  ~ 220
                          ↓
┌─────────────────────────────────────────────────────────┐
│ in response to determining that the height difference   │
│ does not exceed the first threshold, obtaining a        │
│ horizontal dimension difference between the current     │
│ layer 3D model and the single-layer 3D model, and       │
│ determining whether the horizontal dimension            │
│ difference exceeds a second threshold; in response to   │
│ determining that the horizontal dimension difference    │
│ exceeds the second threshold, stopping the printing     │
└─────────────────────────────────────────────────────────┘  ~ 230
                          ↓
┌─────────────────────────────────────────────────────────┐
│ in response to determining that the horizontal          │
│ dimension difference does not exceed the second         │
│ threshold, obtaining a difference map of the current    │
│ layer 3D model and the single-layer 3D model, and       │
│ determining, based on the difference map, whether       │
│ there exists a void region in the printing; and in      │
│ response to determining absence of the void region in   │
│ the printing, printing a next layer based on a          │
│ next layer sequence in the printing path sequence       │
└─────────────────────────────────────────────────────────┘  ~ 240
                          ↓
┌─────────────────────────────────────────────────────────┐
│ in response to determining the presence of the void     │
│ regions in the printing, obtaining void position data   │
│ for the void region in the printing, and printing,      │
│ based on the void position data, the next layer         │
│ after adjusting the next layer sequence                 │
└─────────────────────────────────────────────────────────┘  ~ 250
                          ↓
┌─────────────────────────────────────────────────────────┐
│ in response to determining that printing of the         │
│ printing path sequence is completed, obtaining a 3D     │
│ printed physical object                                 │
└─────────────────────────────────────────────────────────┘  ~ 260
```

FIG. 2

THREE-DIMENSIONAL (3D) PRINTING METHODS, SYSTEMS, AND DEVICES FOR TARGET OBJECTS

CROSS-REFERENCE TO RELATED APPLICATIONS

This application claims priority to Chinese application No. 202311429090.1, filed on Oct. 31, 2023, the entire contents of which are incorporated herein by reference.

TECHNICAL FIELD

The present disclosure relates to the field of image data processing technology, and in particular, to a three-dimensional (3D) printing method, system, and device for a target object.

BACKGROUND

With a development of 3D printing technology, the 3D printing technology has gradually been utilized in many aspects of people's daily life. For example, the 3D printing technology is widely used in the medical community to manufacture customized prostheses, artificial limbs, and medical devices; the application of 3D printing technology to the medical field can improve the quality of life of patients, and reduce the risks of surgery and the medical costs. Additionally, the use of 3D printing technology has great significance for improving the quality of life, driving innovation, lowering costs, and finding alternative ways to solve problems.

In real-time feedback for 3D printing, printed physical objects are often inspected manually and proactively to detect visible defects. For example, manual inspection is configured to check for defects such as poor interlayer adhesion, cracks, loss of fusion, faults, or poor appearance, and then to decide how to proceed with next operations in the printing program. This approach requires a professional to proactively identify defects, with lower stability and expertise. In addition, 3D printers usually have sensors and monitoring systems to monitor temperature, printhead status, print speed, and interlayer adhesion, which allow for real-time detection and feedback. However, this approach is driven by the printer's state to identify the problems in the printing process, and the difference between the theoretical error and the actual error is significant, which results in a low degree of similarity between the printed physical object and the target object.

Therefore, it is desirable to provide a three-dimensional (3D) printing method, system, and device for a target object, which can improve the similarity between the printed physical object and the target object, and realize more accurate 3D printing.

SUMMARY

One of the embodiments of the present disclosure provides a three-dimensional (3D) printing method for a target object, the method is executed by a processor, and the method comprises: obtaining a 3D model of a target object, determining a printing path sequence and a multilayer 3D model based on the 3D model of the target object; obtaining a height difference between a current layer 3D model and a single-layer 3D model corresponding to the current layer 3D model, based on a current layer sequence of the printing path sequence after completing printing of a current layer, and determining whether the height difference exceeds a first threshold; in response to determining that the height difference exceeds the first threshold, stopping printing; in response to determining that the height difference does not exceed the first threshold, obtaining a horizontal dimension difference between the current layer 3D model and the single-layer 3D model, and determining whether the horizontal dimension difference exceeds a second threshold; in response to determining that the horizontal dimension difference exceeds the second threshold, stopping the printing; in response to determining that the horizontal dimension difference does not exceed the second threshold, obtaining a difference map of the current layer 3D model and the single-layer 3D model, and determining, based on the difference map, whether there exists a void region in the printing; and in response to determining absence of the void region in the printing, printing a next layer based on a next layer sequence in the printing path sequence; in response to determining the presence of the void regions in the printing, obtaining void position data for the void region in the printing, and printing, based on the void position data, the next layer after adjusting the next layer sequence; and in response to determining that printing of the printing path sequence is completed, obtaining a 3D printed physical object.

One of the embodiments of the present disclosure provides a three-dimensional (3D) printing system for a target object, the system comprises: a generation module, which is configured to: obtain a 3D model of a target object, determine a printing path sequence and a multilayer 3D model based on the 3D model of the target object; a first judgment module, which is configured to obtain a height difference between a current layer 3D model and a single-layer 3D model corresponding to the current layer 3D model, based on a current layer sequence of the printing path sequence after completing printing of a current layer, and determine whether the height difference exceeds a first threshold; in response to determining that the height difference exceeds the first threshold, stop printing; a second judgment module, in response to determining that the height difference does not exceed the first threshold, which is configured to: obtain a horizontal dimension difference between the current layer 3D model and the single-layer 3D model, and determine whether the horizontal dimension difference exceeds a second threshold; in response to determining that the horizontal dimension difference exceeds the second threshold, stop the printing; a third judgment module, in response to determining that the horizontal dimension difference does not exceed the second threshold, which is configured to: obtain a difference map of the current layer 3D model and the single-layer 3D model, and determine, based on the difference map, whether there exists a void region in the printing; and in response to determining absence of the void region in the printing, print a next layer based on a next layer sequence in the printing path sequence; an adjustment module, in response to determining the presence of the void regions in the printing, which is configured to: obtain void position data for the void region in the printing, and print, based on the void position data, the next layer after adjusting the next layer sequence; and an acquisition module, in response to determining that printing of the printing path sequence is completed, which is configured to: obtain a 3D printed physical object.

One of the embodiments of the present disclosure provides a three-dimensional (3D) printing apparatus for a target object, wherein the apparatus comprises a processor and a memory, wherein the processor executing a computer program stored in the memory implements the 3D printing method for the target object.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is an exemplary flowchart illustrating a three-dimensional (3D) printing process for a target object according to some embodiments of the present disclosure;

DETAILED DESCRIPTION

In order to more clearly illustrate the technical solutions of the embodiments of the present disclosure, the accompanying drawings, which are required to be used in the description of the embodiments, are briefly described below. The accompanying drawings do not represent the entirety of the embodiments.

It should be understood that as used herein, the terms "system," "device," "unit" and/or "module" are used herein as a way to distinguish between different components, elements, parts, sections or assemblies at different levels. Words may be replaced by other expressions if other words accomplish the same purpose.

Unless the context clearly suggests an exception, the words "one," "a," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

When describing the operations performed in the embodiments of the present specification in step-by-step instructions, the order of the steps is all interchangeable if not otherwise indicated, the steps may be omitted, and other steps may be included in the course of the operations.

Figure 1:
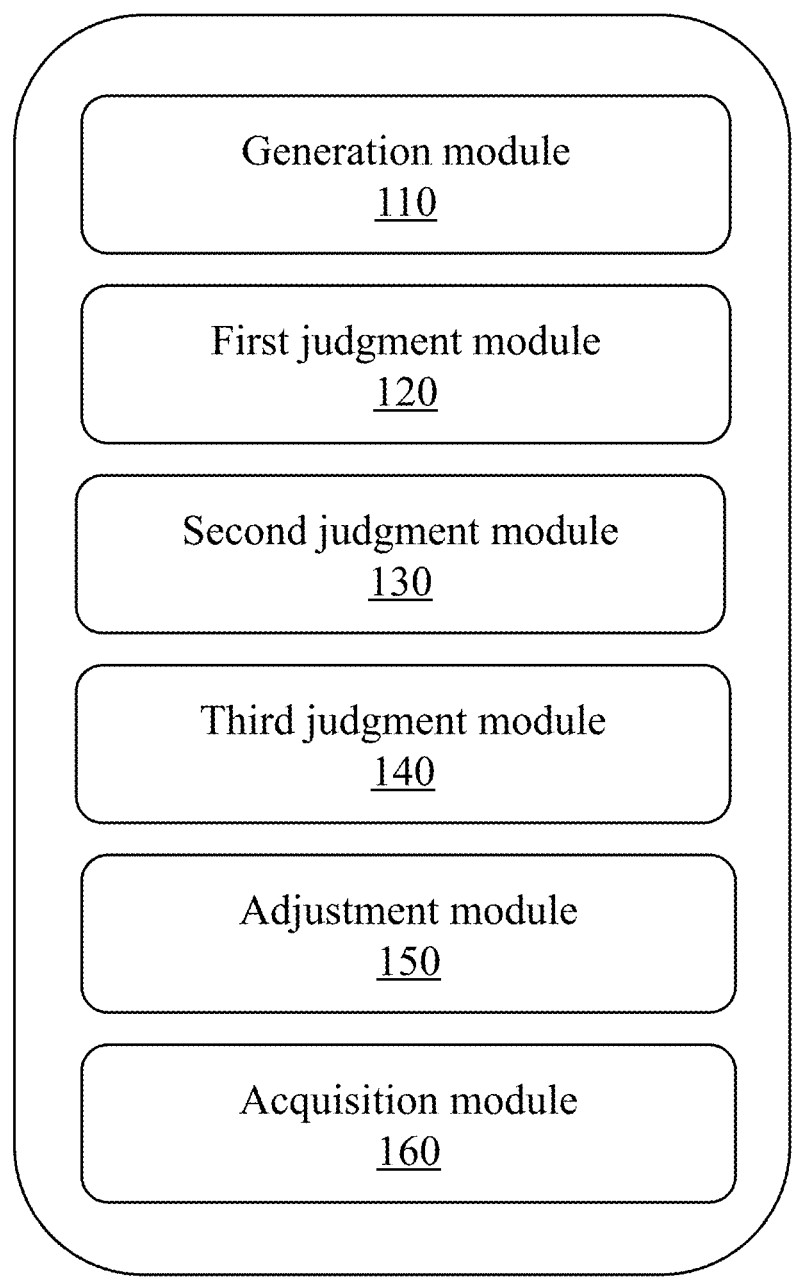
FIG. 1 is a module schematic diagram illustrating a three-dimensional (3D) printing system for a target object according to some embodiments of the present disclosure.

FIG. 1 is a module diagram illustrating a three-dimensional (3D) printing system for a target object according to some embodiments of the present disclosure. In some embodiments, the three-dimensional (3D) printing system 100 for the target object includes a generation module 110, a first judgment module 120, a second judgment module 130, a third judgment module 140, an adjustment module 150, and an acquisition module 160.

In some embodiments, the generation module 110 is configured to: obtain a 3D model of a target object, and determine a printing path sequence and a multilayer 3D model based on the 3D model of the target object.

In some embodiments, the generation module 110 is further configured to: obtain point cloud data of the 3D model of the target object and perform a layering process to obtain multilayer point cloud data; wherein in the multilayer point cloud data, single-layer sequences corresponding to all single-layer point cloud data are formed as a multi-layer sequence; partition a current layer point cloud based on a preset print line width and a preset coordinate origin to obtain a multi-region point cloud set corresponding to the current layer; connect all single-area point clouds of the multi-region point cloud set based on a single-layer printing direction to obtain an initial path sequence; preset a sliding window; traverse the initial path sequence based on the sliding window, average point cloud data within the sliding window in an Z-axis direction as a print height, and combine the print height with the initial path sequence to obtain the current layer sequence; and connect the single-layer sequences based on a predetermined order to obtain the printing path sequence.

In some embodiments, the first judgment module 120 is configured to: obtain a height difference between a current layer 3D model and a single-layer 3D model corresponding to the current layer 3D model, based on a current layer sequence of the printing path sequence after completing printing of a current layer, and determine whether the height difference exceeds a first threshold; in response to determining that the height difference exceeds the first threshold, stop printing.

In some embodiments, in response to determining that the height difference does not exceed the first threshold, the second judgment module 130 is configured to: obtain a horizontal dimension difference between the current layer 3D model and the single-layer 3D model, and determine whether the horizontal dimension difference exceeds a second threshold; in response to determining that the horizontal dimension difference exceeds the second threshold, the second judgment module 130 is configured to: stop the printing.

In some embodiments, in response to determining that the horizontal dimension difference does not exceed the second threshold, the third judgment module 140 is configured to: obtain a difference map of the current layer 3D model and the single-layer 3D model, and determine, based on the difference map, whether there exists a void region in the printing; and in response to determining absence of the void region in the printing, the third judgment module 140 is configured to: print a next layer based on a next layer sequence in the printing path sequence.

In some embodiments, the third judgment module 140 is further configured to: obtain a difference map of a projection of the current layer 3D model onto a two-dimensional plane and a projection of the single-layer 3D model onto the two-dimensional plane; determine whether a target region with a pixel mean greater than a third threshold occurs in the difference map; and in response to the presence of the target region in the difference map, determine that the target region is the void region in the printing; in response to the absence of the target region in the difference map, determine that there is no the void region in the printing.

In some embodiments, in response to determining that a count of gray regions in the single-layer 3D model whose difference from the predicted void gray level is less than a difference threshold exceeds a predetermined number, the third judgment module 140 is further configured to: obtain an updated luminance; and generate a luminance adjustment instruction based on the updated luminance and send the luminance adjustment instruction to a lighting device to adjust the illumination luminance of the lighting device.

In some embodiments, in response to determining the presence of the void region in the printing, the adjustment module 150 is configured to: obtain void position data for the void region in the printing, and print, based on the void position data, the next layer after adjusting the next layer sequence.

In some embodiments, in response to determining that printing of the printing path sequence is completed, the acquisition module 160 is configured to: obtain a 3D printed physical object.

In some embodiments, the system 100 further includes a lighting device (not shown in the figures). In some embodiments, the lighting device is configured to illuminate a printed physical object at a predetermined luminance. The predetermined luminance is a preset brightness at which the lighting device illuminates the printed physical object. The predetermined luminance is set by the system or by the user.

In some embodiments, the system 100 includes a storage device, a processor, or the like, and the processor may access the storage device to retrieve pre-stored data and/or information. In some embodiments, the generation module 110, the first judgment module 120, the second judgment module 130, the third judgment module 140, the adjustment module 150, and the acquisition module 160 of the system 100 may be integrated into the processor. In some embodiments of the present disclosure, the system 100 includes a network. The processor may obtain data and/or information related to the system 100 through the network.

It is to be noted that the above description of the system and the modules thereof is provided only for descriptive convenience, and does not limit the present disclosure to the scope of the embodiments. It is to be understood that for a person skilled in the art, after understanding the principle of the system, it may be possible to arbitrarily combine the individual modules or form a sub-system to be connected to the other modules without departing from the principle.

FIG. 2 is an exemplary flowchart illustrating a three-dimensional (3D) printing process for a target object according to some embodiments of the present disclosure.

In some embodiments, the processor may obtain a 3D model of a target object, determine a printing path sequence and a multilayer 3D model based on the 3D model of the target object; obtain a height difference between a current layer 3D model and a single-layer 3D model corresponding to the current layer 3D model, based on a current layer sequence of the printing path sequence after completing printing of a current layer, and determine whether the height difference exceeds a first threshold; in response to determining that the height difference exceeds the first threshold, stop printing; in response to determining that the height difference does not exceed the first threshold, obtain a horizontal dimension difference between the current layer 3D model and the single-layer 3D model, and determine whether the horizontal dimension difference exceeds a second threshold; in response to determining that the horizontal dimension difference exceeds the second threshold, stop the printing; in response to determining that the horizontal dimension difference does not exceed the second threshold, obtain a difference map of the current layer 3D model and the single-layer 3D model, and determine, based on the difference map, whether there exists a void region in the printing; and in response to determining the absence of the void region in the printing, print a next layer based on a next layer sequence in the printing path sequence; in response to determining the presence of the void regions in the printing, obtain void position data for the void region in the printing, and print, based on the void position data, the next layer after adjusting the next layer sequence; and in response to determining that printing of the printing path sequence is completed, obtain a 3D printed physical object.

In some embodiments, the process 200 may be executed by a processor of the 3D printing system for the target object. As shown in FIG. 2, the process 200 includes following operations:

In 210, a 3D model of a target object is obtained, and a printing path sequence and a multilayer 3D model are determined based on the 3D model of the target object.

The 3D model of the target object is a corresponding 3D model of the target object.

The target object is a target item to be 3D printed. For example, the target object may include prototype parts of malleable materials, aircraft engine components, medical prosthetic limbs, bionic organs, and customized food products.

In some embodiments, the processor may scan the target object using a 3D scanner, build a 3D model with spatial location information, and save the 3D model with the spatial location information in a form of point cloud data to obtain the 3D model of the target object.

The multilayer 3D model is a multilayer 3D model including a plurality of single-layer 3D models obtained after layering the 3D model of the target object. For example, the multilayer 3D model may be a multilayer 3D model including a plurality of single-layer 3D models obtained after performing a horizontal cut of the target object. The multilayer 3D model may also be referred to as a multilayer 3D model of the target object.

In some embodiments, the processor may determine a count of prints and a print layer height corresponding to each print based on a print line width and height of the target object; based on the print layer height corresponding to each print, perform the horizontal cut and divide the 3D model of the target object into a plurality of single-layer 3D models stacked on top and bottom to obtain the multilayer 3D model.

The print line width is a width at which the nozzle extrudes a single piece of melted consumable filament during printing. The processor may determine the print line width based on a diameter of a pinhole of the printer and a speed at which the raw material is ejected from the pinhole. Exemplarily, the larger the diameter of the pinhole, and the faster the speed of the raw material ejection from the pinhole, which corresponds to a larger print line width.

The height of the target object may be acquired by scanning with the 3D scanner.

The count of prints is a count of times 3D layered printing is performed. The print layer height is a print height of each layer when performing 3D layered printing.

In some embodiments, the processor may determine the count of prints and the print layer height corresponding to each print in a variety of ways based on the print line width and the height of the target object. Exemplarily, the greater the print line width, the greater the print layer height; and the greater the height of the target object, the greater the count of prints. For example, the processor may determine 50% of the print line width as the print layer height for each layer except the last layer, and determine the count of prints based on the height of the target object and the print layer height, wherein the print layer height for the last layer is a difference between the height of the target object and a sum of the print layer heights of all preceding layers.

In some embodiments, the processor may perform the horizontal cut and divide the 3D model of the target object into a plurality of single-layer 3D models to be printed stacked top and bottom based on the print layer height for each print, wherein the height of the single-layer 3D model corresponding to each layer is the same as the height of that layer corresponding to the print layer height. The combination of the plurality of single-layer 3D models constitutes the multilayer 3D model.

The printing path sequence is a sequence consisting of the printing paths for 3D printing. The printing path sequence may also be referred to as the print planning path sequence.

In some embodiments, the processor may obtain point cloud data of the 3D model of the target object and perform a layering process to obtain multilayer point cloud data; wherein in the multilayer point cloud data, single-layer sequences corresponding to all single-layer point cloud data are formed as a multi-layer sequence; partition a current layer point cloud based on a preset print line width and a preset coordinate origin to obtain a multi-region point cloud set corresponding to the current layer; connect all single-area point clouds of the multi-region point cloud set based on a single-layer printing direction to obtain an initial path sequence; preset a sliding window; traverse the initial path sequence based on the sliding window, average point cloud data within the sliding window in an Z-axis direction as a print height, and combine the print height with the initial path sequence to obtain the current layer sequence; and connect the single-layer sequences based on a predetermined order to obtain the printing path sequence.

In some embodiments, the processor may obtain, via a storage device, the point cloud data of the 3D model of the target object stored when the 3D scanner scans the target object.

The layering process refers to layering the point cloud data of the 3D model of the target object and dividing the point cloud data of the 3D model of the target object into the multilayer point cloud data. The multilayer point cloud data refers to point cloud data of the 3D model of the target object is layered and processed into the multilayer point cloud data consisting of point cloud data of each layer.

In some embodiments, the processor may perform horizontal layering processing on the point cloud data of the 3D model of the target object based on the print layer height of each layer, and the point cloud data of each layer is point cloud data corresponding to the target object at the layer.

In some embodiments, in the multilayer point cloud data, the multi-layer sequence is formed by arranging the single-layer sequences corresponding to all of the single-layer point cloud data in order of the count of layers. The single-layer sequence refers to a printing path sequence of a layer corresponding to the single-layer point cloud data, and the single-layer sequence may also be referred to as a single-layer printing path sequence. The multi-layer sequence is a collection of multiple single-layer sequences in the printing path sequence, and the multi-layer sequence may also be referred to a multi-layer printing path sequence.

In some embodiments, the processor may perform a flip process and a down-sampling process on the point cloud data of the 3D model of the target object before the partition.

The flip process refers to a mirror-flip processing of point cloud data.

The down-sampling process refers to reducing the amount of point cloud data and retaining key information. In some embodiments, the processor may perform the down-sampling process on the point cloud data using process such as voxel grid down-sampling or uniform down-sampling.

In some embodiments of the present disclosure, the point cloud data of the 3D model of the target object is subjected to the flip process and the down-sampling process prior to the layering process, which can reduce the density of the point cloud and improve computational efficiency.

The preset print line width is a pre-set print line width that may be set by the system or by the user.

The preset coordinate origin is a pre-set coordinate origin for performing 3D printing. The preset coordinate origin may also be referred to as a preset print coordinate origin. In some embodiments, the preset coordinate origin may be preset by the system or by the user. For example, the preset coordinate origin may be a first point in the printing path sequence where printing is performed or a center point of the print bed in the 3D printing device.

In some embodiments, the processor may establish a coordinate system based on the preset coordinate origin. For example, the processor may establish the coordinate system for 3D printing based on the preset coordinate origin with a direction pointing to a right side of the printer as an X-axis positive direction, a direction pointing to a rear side of the printer as a Y-axis positive direction, and a direction pointing to a top of the printer as a Z-axis positive direction.

The multi-region point cloud set is a collection composed of point cloud data from multiple different regions of the current layer after partitioning the current layer point cloud. The current layer point cloud refers to point cloud data corresponding to the layer currently undergoing printing in the multilayer point cloud data. The current layer point cloud may also be referred to as the current layer point cloud data, and the multi-region point cloud set may also be referred to as the current layer multi-region point cloud data set.

In some embodiments, the processor may cut, based on the preset coordinate origin, the current layer point cloud for partitioning according to the preset print line width along the X-axis direction, obtain a strip-like plurality of single-area point clouds, the plurality of single-area point clouds may form the multi-region point cloud set corresponding to the current layer, wherein a position width of each single-area point cloud is equal to the preset print line width. The single-area point cloud is point cloud data corresponding to the single area after partitioning. The single-area point cloud may also be referred to as single-area point cloud data. The position width of the single-area point cloud is a width of a position occupied by the single-area point cloud.

The single-layer printing direction is a printing direction corresponding to each layer of the multilayer 3D model. The single-layer printing direction may be preset by the system or by the user. For example, the single-layer printing direction may include the printing direction of each layer, such as a printing direction of a particular layer being printing in a positive direction of the X-axis-a negative direction of the X-axis-a positive direction of the X-axis.

The initial path sequence is an initial current layer sequence. The initial path sequence may also be referred to as an initial printing path sequence. The current layer sequence is a printing path sequence for the current layer, and the current layer sequence may also be called a current layer printing path sequence.

In some embodiments, the processor may connect the single-area point clouds in the multi-region point cloud set based on the single-layer printing direction to obtain the initial path sequence. For example, the processor may sequence all single-area point clouds in the multi-region point cloud set based on the print direction of the current layer in the single-layer printing direction, and connect a tail of the previous single-area point cloud to a head of the next single-area point cloud, and so on, to form a complete initial path sequence on the X-axis and Y axis.

The sliding window is a window that divides the initial path sequence by sliding. The sliding window may be preset by the system or by the user. In some embodiments, the processor may determine the print line width as a width of the sliding window and determine a height of the sliding window based on the print layer height of the current layer.

The print height is a height position of a needle of the printer when printing.

In some embodiments, the processor may utilize the sliding window to traverse the initial path sequence and use a mean value of all the point cloud data in the sliding window in the Z-axis direction (i.e., the height data in the point cloud data) as the print height. The value of the point cloud data in the Z-axis direction is a height data of the point cloud data, and the value of the point cloud data in the X-axis and Y-axis direction is a horizontal data of the point cloud data. By determining the print height, a thickness of the print material at a plane position corresponding to the current layer can be controlled.

In some embodiments, the processor may form the current layer sequence by combining the print height with the initial path sequence on the X-axis and Y-axis. The printer may print the current layer based on the current layer sequence using the print height as the height position of the needle of the printer when the printer performs the printing along the initial path sequence on the X-axis and Y-axis.

The predetermined order is a pre-set order of print paths for the multi-layer sequence. The predetermined order may also be referred to as a preset multilayer print path order. For example, the predetermined order may include a connection order for each single-layer sequence. Exemplarily, the predetermined order may be an order in which the single-layer sequences are connected in a sequence of layers and a tail of the previous single-layer sequence is connected back and forth with a head of the next single-layer sequence.

In some embodiments, the processor may connect the tail of the previous single-layer sequence to the head of the next single-layer sequence, and so on in a serial connection according to the predetermined order to obtain the printing path sequence.

In some embodiments, the processor may obtain the current layer 3D model; determine whether the current layer 3D model and the single-layer 3D model satisfy an adjustment condition; and in response to determining that the current layer 3D model and the single-layer 3D model satisfy the adjustment condition, adjust the next layer sequence based on the current layer 3D model and the single-layer 3D model.

The current layer 3D model is a 3D model corresponding to the printed physical object of the current layer. More descriptions of the acquisition of the current layer 3D model may be found in FIG. 2 and related descriptions.

The single-layer 3D model is a single-layer 3D model of the target object corresponding to the current layer, and the single-layer 3D model may also be referred to as a target object single-layer 3D model. The processor may obtain the single-layer 3D model corresponding to the current layer based on the multilayer 3D model.

The adjustment condition is a condition used to determine whether to adjust the next layer sequence.

The next layer sequence is a printing path sequence corresponding to the layer that needs to be printed after completing the printing of the current layer. The next layer sequence may also be called a next layer printing path sequence.

The adjustment condition may be preset by the system or by the user. The exemplary adjustment condition may be a height difference between the current layer 3D model and the corresponding single-layer 3D model being greater than a fourth threshold and/or a horizontal dimension difference between the current layer 3D model and the single-layer 3D model being greater than a fifth threshold. The fourth threshold and the fifth threshold may be preset values. The fourth threshold is less than a first threshold and the fifth threshold is less than the second threshold. More descriptions of the height difference, the horizontal dimension difference, the first threshold, and the second threshold may be found in FIG. 2 and related descriptions.

In some embodiments, the processor may adjust the next layer sequence in a variety of ways based on the current layer 3D model and the single-layer 3D model.

In response to the height difference being greater than the fourth threshold, the processor may increase or decrease the length of the print path in the Z-axis direction in the next layer sequence to achieve a size of the target object corresponding to that layer. For example, in response to the height difference being greater than the fourth threshold and the 3D model of the target object being undersized in the Z-axis direction as compared to the single-layer 3D model, the processor may appropriately lengthen the length of the path in the Z-axis direction in the next layer sequence; and conversely, the path length in the Z-axis direction is appropriately shortened.

For example, if the print height corresponding to the current layer 3D model is 1 mm lower than the print height corresponding to the single-layer 3D model, the processor may increase the print height in the next layer sequence by 1 mm.

In response to the horizontal dimension difference being greater than the fifth threshold, the processor may increase or decrease the length of the print path in the X-axis direction and/or the Y-axis direction in the next layer sequence to achieve the size of the target object corresponding to the layer. For example, if the horizontal dimension difference is greater than the fifth threshold and the 3D model of the target object is undersized in the X-axis direction as compared to the single-layer 3D model, the processor may appropriately lengthen the length of the path in the X-axis direction in the next layer sequence; conversely, no adjustment is performed.

For example, if the single-layer 3D model is 100 mm in the X-axis direction and the current layer 3D model is 95 mm in the X-axis direction (i.e., 5 mm off), the processor may add 5 mm to the path length in the X-axis direction in the next layer sequence.

Figure 3:
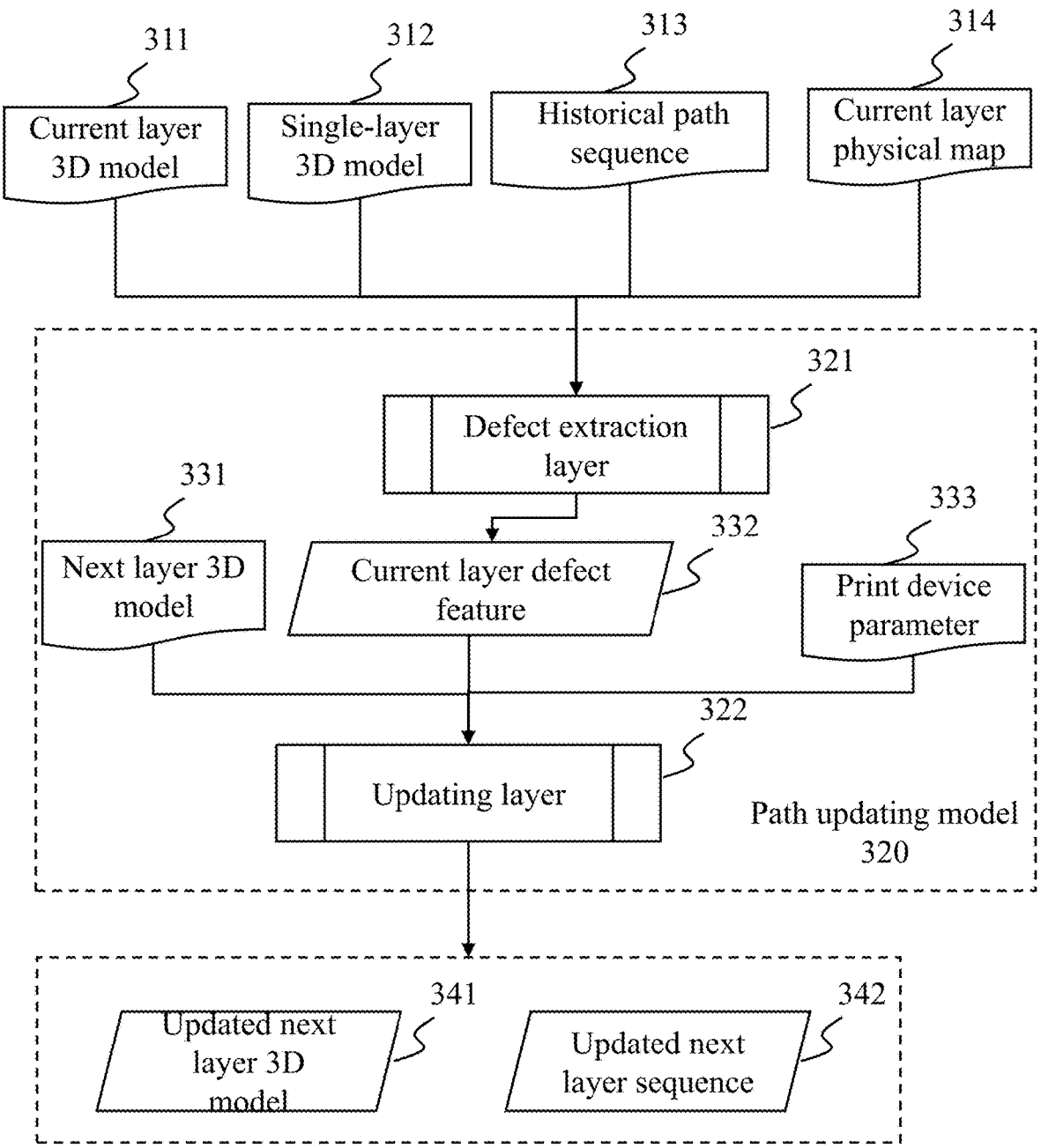
FIG. 3 is an exemplary schematic diagram illustrating a path updating model according to some embodiments of the present disclosure.

In some embodiments, the processor may adjust the next layer sequence via a path updating model, more descriptions of the path updating model may be found in FIG. 3 and related descriptions.

In some embodiments of the present disclosure, when the adjustment condition is satisfied, the next layer sequence is adjusted based on the current layer 3D model and the single-layer 3D model, which can compensate for the printing bias of the current layer to a certain extent and improve the similarity between the printed physical object and the target object.

It should be noted that if print height data does not exist in a position sequence in the printing path sequence, the position sequence is an unneeded print point, and the processor may set a print state of the position sequence to off and increase the print pin height at the position so that the position can safely pass through the region and does not touch the printed physical object. The processor may also correct positional coordinates of the point cloud data in the printing path sequence according to the positional requirements of the actual printed physical object, so as to align the point cloud data with the coordinate system of the printer and to facilitate accurate and fast 3D printing.

Some embodiments of the present disclosure, by layering and partitioning the point cloud data, determining the print height based on the sliding window, and combining the print height with the initial print sequence to obtain the current layer sequence; and based on the predetermined order, after connecting the single-layer sequences, obtaining the printing path sequence, the printing path sequence that meets the printing requirements can be determined and the accuracy of 3D printing can be improved.

In 220, a height difference between a current layer 3D model and a single-layer 3D model corresponding to the current layer 3D model is obtained based on a current layer sequence of the printing path sequence after completing printing of a current layer, and whether the height difference exceeds a first threshold is determined; in response to determining that the height difference exceeds the first threshold, printing is stopped.

The current layer 3D model is a 3D model corresponding to the printed physical object of the current layer. The current layer 3D model may also be referred to as a current layer printed physical object 3D model.

In some embodiments, the processor may obtain a current layer print image and a current layer physical map; obtain a height dataset of the current layer physical map; and obtain the current layer 3D model through combining the height dataset with an edge contour map of the current layer physical map based on corresponding positions.

The current layer printed physical object is a printed physical object corresponding to the current layer obtained after printing on the current layer.

The current layer physical map is a print physical map corresponding to the current layer, the current layer physical map may also be called a current layer print physical map.

In some embodiments, the processor may obtain the current layer print image based on an image acquisition device such as a camera, a video camera, or the like, and determine the current layer print image as the current layer physical map.

The height dataset is a collection of height data consisting of different positions of the current layer printed physical object in the current layer physical map. The different positions refer to different points of the current layer printed physical object in the X-axis direction and the Y-axis direction.

In some embodiments of the present disclosure, the processor may obtain an image of a circle of the current layer of printed physical object, and based on the current layer physical map, and obtain a circle of height data of the current layer of printed physical object using a process of projective geometric resolution to further obtain the height dataset. The circle of the current layer printed physical object refers to 360° around the current layer printed physical object. For example, the processor may obtain a panoramic image including a circle of the current layer printed physical object by a panoramic camera and obtain height data including a circle of the current layer printed physical object by utilizing a process of projective geometric resolution to thereby obtain a height dataset.

The edge contour map is a diagram that consists of edge contours of the printed physical object of the current layer in the current layer physical map. In some embodiments of the present disclosure, the processor may utilize Sobel operator to obtain the edge contour map of the current layer printed physical object.

In some embodiments of the present disclosure, the processor may combine the height dataset with the edge contour map of the current layer physical map based on the corresponding location to obtain the current layer 3D model. For example, the processor may combine a point in the edge contour with height data of the point at a corresponding location in the height dataset to obtain height data corresponding to different points in the edge contour, and thus obtain the current layer 3D model.

Some embodiments of the present disclosure, by combining the height dataset with the edge contour map of the current layer physical map based on the corresponding position, the current layer 3D model can be quickly and accurately obtained, which helps to subsequently determine a more accurate height difference.

More description of the single-layer 3D model and the acquisition may be found in FIG. 2 and related descriptions.

The height difference is a difference between the height data of the current layer 3D model and the corresponding single-layer 3D model at the same position.

In some embodiments of the present disclosure, the processor may determine a height difference based on an absolute value of the difference of height data in the current layer 3D model and the corresponding single-layer 3D model at each position to obtain the height difference. For example, the processor may determine an average of the absolute values of the difference of the height data in the current layer 3D model and in the corresponding single-layer 3D model at each position as the height difference.

The first threshold is a threshold condition for determining whether to proceed further with the horizontal dimension difference judgment. In some embodiments of the present disclosure, the first threshold may be preset by the system or by the user.

The exemplary first threshold may be 10% of the print layer height of the current layer. More descriptions of the acquisition of the print layer height of the current layer may be found in FIG. 2 and related descriptions.

In some embodiments of the present disclosure, in response to the height difference exceeding the first threshold, the printer may stop printing; the processor may notify a maintenance person to perform maintenance on the printer after stopping printing.

In 230, in response to determining that the height difference does not exceed the first threshold, a horizontal dimension difference between the current layer 3D model and the single-layer 3D model is determined, and whether the horizontal dimension difference exceeds a second threshold is determined; in response to determining that the horizontal dimension difference exceeds the second threshold, the printing is stopped.

The horizontal dimension difference is a difference in dimensions between the current layer 3D model and the single-layer 3D model in the horizontal direction, and the horizontal dimension difference may also be called a horizontal directional dimension difference.

In some embodiments of the present disclosure, the horizontal dimension difference may be: a difference between a maximum value along an X-axis of a projection of the current layer 3D model onto a two-dimensional plane and a maximum value along an X-axis of a projection of the single-layer 3D model onto the two-dimensional plane; a difference between a maximum value along a Y-axis of a projection of the current layer 3D model onto the two-dimensional plane and a maximum value along a Y-axis of a projection of the single-layer 3D model onto the two-dimensional plane; a difference between a minimum value along the Y-axis of the projection of the current layer 3D model onto the two-dimensional plane and a minimum value along the Y-axis of the projection of the single-layer 3D model onto the two-dimensional plane. The two-dimensional plane is a two-dimensional plane formed by the X-axis and Y-axis.

In some embodiments of the present disclosure, the processor may determine an absolute value of a difference between the maximum value along the X-axis direction of the projection of the current layer 3D model onto the two-dimensional plane and the maximum value along the X-axis direction of a projection of the single-layer 3D model onto the two-dimensional plane as a first horizontal dimension difference; determine an absolute value of a difference between the minimum value along the X-axis direction of the projection of the current layer 3D model onto the two-dimensional plane and the minimum value along the X-axis direction of the projection of the single-layer 3D model onto the two-dimensional plane as a second horizontal dimension difference; determine an absolute value of a difference between the maximum value along the Y-axis direction of the projection of the current layer 3D model onto the two-dimensional plane and the maximum value along the Y-axis direction of the projection of the single-layer 3D model onto the two-dimensional plane as a third horizontal dimension difference; and determine an absolute value of a difference between the minimum value along the Y-axis direction of the projection of the current layer 3D model onto the two-dimensional plane and the minimum value along the Y-axis direction of the projection of the single-layer 3D model onto the two-dimensional plane as a fourth horizontal dimension difference.

In some embodiments of the present disclosure, the processor may determine a statistical value of the first horizontal dimension difference, the second horizontal dimension difference, the third horizontal dimension difference, and the fourth horizontal dimension difference as a horizontal dimension difference. For example, the processor may determine an extreme value, and a mean value of the first horizontal dimension difference, the second horizontal dimension difference, the third horizontal dimension difference, and the fourth horizontal dimension difference as the horizontal dimension difference.

Some embodiments of the present disclosure, by projecting the current layer 3D model and the corresponding single-layer 3D model onto the two-dimensional plane, the horizontal dimension difference is obtained between the two in the same direction, which helps to make a more accurate judgment of the horizontal dimension difference, and improves the 3D printing accuracy.

The second threshold is a threshold condition for determining whether to identify the void region in the printing. In some embodiments of the present disclosure, the second threshold may be preset by the system or by the user.

For example, the second threshold may be 20% of the print line width. If any of the first horizontal dimension difference, the second horizontal dimension difference, the third horizontal dimension difference, and the fourth horizontal dimension difference exceeds the second threshold, the processor may perform operation 240; if the first horizontal dimension difference, the second horizontal dimension difference, the third horizontal dimension difference do not exceed the second threshold, the processor may stop printing.

In 240, in response to determining that the horizontal dimension difference does not exceed the second threshold, a difference map of the current layer 3D model and the single-layer 3D model are obtained, and based on the difference map, whether there exists a void region in the printing is determined; and in response to determining absence of the void region in the printing, a next layer is printed based on a next layer sequence in the printing path sequence.

The difference map is visual images for comparing differences between the current layer 3D model and the corresponding single-layer 3D model. In some embodiments, the processor may project the point cloud data in the current layer 3D model onto the two-dimensional plane to obtain the current layer planar map, and project the corresponding single-layer 3D model onto the two-dimensional plane to obtain the single layer planar map; the current layer planar map and the single layer planar map are aligned to obtain the difference map.

The void region in the printing is a region existing a print error.

In some embodiments, the processor may obtain a difference map of a projection of the current layer 3D model onto the two-dimensional plane and a projection of the single-layer 3D model onto the two-dimensional plane; determine whether a target region with a pixel mean greater than a third threshold occurs in the difference map; and in response to the presence of the target region in the difference map, determine that the target region is the void region in the printing; in response to the absence of the target region in the difference map, determine that there is no the void region in the printing. The determination of the difference map may be described in relation to operations 240 previously.

In some embodiments, the difference map may be partitioned into different regions. The difference map may be partitioned into regions by the user or by the system. For example, the processor may divide the difference map into a plurality of rectangular regions from the preset coordinate origin using the preset print line width as a length in the X-axis direction and the print layer height as a length in the Y-axis direction. The target region is a region in the difference map where a pixel mean value is greater than the third threshold. The pixel mean is a mean value of the pixel values of the pixel points in the same area in the difference map.

In some embodiments, the processor may identify a region on the difference map with a pixel mean greater than a third threshold as a target region.

The third threshold is a pixel threshold for determining whether there is a void region in the printing, and the third threshold may be set by the system or by the user. When a region with a pixel mean value greater than the third threshold appears in the difference map, it is proved that the coordinate point data of the region is inconsistent with that of the current layer planar map and the upper corresponding position of the single-layer planar map, respectively, and the printing process of the region has an error, the target region is the void region in the printing; if no area with a pixel mean value greater than the third threshold appears in the difference map, it indicates that the current layer of the printing process is normal, and there is no void region in the printing.

In some embodiments, the third threshold is determined based on gray values of a plurality of gray regions of the single-layer 3D model and a predicted void gray level.

The plurality of gray regions are multiple regions obtained by dividing a grayscale map of the single-layer 3D model based on the gray value.

In some embodiments, the processor may generate a corresponding grayscale map based on the single-layer 3D model, wherein the gray value of each pixel point may reflect a brightness of the pixel point, and the larger the gray value, the brighter the pixel point. The processor may determine the gray value of each pixel point in the single-layer 3D model by various feasible ways such as floating-point methods, integer methods, or the like, and thus generate the grayscale map.

In some embodiments, the processor may divide the grayscale map into a plurality of gray regions based on the gray values of different points in the gray-scale map corresponding to the single-layer 3D model. For example, the processor may use image segmentation techniques to divide the gray regions. The exemplary image segmentation techniques may include a thresholding-based process (e.g., Otsu's thresholding), a clustering process (e.g., K-means), or other advanced segmentation techniques.

In some embodiments, the processor may determine a mean value of the gray value of each of the plurality of pixel points in the gray region as the gray value of the gray region.

The predicted void gray level is a predicted gray value of the void region in the printing.

In some embodiments, the processor may construct a print feature vector based on the print material, the printed physical object dimension, and print device parameters; and, based on the print feature vector, determine the predicted void gray level by using a vector database.

The print material is a type of material used for 3D printing, and when the type of material used for 3D printing is a mixed material, the print material may include a type and specific content of each material in the mixed material. The print material may be entered by the user.

The printed physical object dimension is dimensional data of the 3D printing target object, which may be obtained by scanning the 3D scanner.

The print device parameters are operational parameters related to 3D printing by the print device. For example, the print device parameters may include print temperature, print stock thickness, or the like. The print device parameters may be set by a user.

The vector database may include a plurality of sets of reference vectors and reference void gray levels corresponding to the reference vectors. The processor may collect a large number of print materials, printed physical object dimensions, and print device parameters as the plurality of sets of reference vectors based on actually conducting the printing experiments; and, during the printing experiments, print out voids in the printed physical objects and record gray values corresponding to the voids as reference void gray scales corresponding to the reference vectors. When a plurality of voids exists in the printing, the processor may determine a mean value of the gray values of the plurality of voids as a reference void grayscale. The processor may place the plurality of reference vectors and the corresponding reference void grayscale into a vector database that supports fast similarity searches for high-dimensional vectors, such as Milvus, Faiss, or the like, to obtain a vector database.

In some embodiments of the present disclosure, the processor may determine, based on the print feature vectors, a reference void grayscale corresponding to a reference vector with the highest similarity to the print feature vectors as the predicted void gray level in the vector database.

In some embodiments, the processor may determine the third thresholds corresponding to different gray regions based on gray values of the plurality of gray regions of the single-layer 3D model and the predicted void gray level. Exemplarily, the closer the gray values of the gray regions are to the predicted void gray level, the smaller the third threshold corresponding to that gray region.

In some embodiments of the present disclosure, by determining the third thresholds corresponding to different gray regions based on the gray values of the plurality of gray regions of the single-layer 3D model and the predicted void gray level, different third thresholds can be determined according to different gray regions, which can improve the accuracy of determining the void region in the printing.

In some embodiments, in response to determining that a count of grayscale regions in the single-layer 3D model whose difference from the predicted void gray level is less than a difference threshold exceeds a predetermined number, the processor may obtain an updated luminance; and generate a luminance adjustment instruction based on the updated luminance and send the luminance adjustment instruction to a lighting device to adjust the illumination luminance of the lighting device.

More descriptions of the lighting device may be found in FIG. 1 and related descriptions. The difference threshold is a threshold condition for determining whether to identify the updated illumination based on the difference between the gray value of the gray region and the predicted void gray level. In some embodiments, the predetermined number may be positively correlated to the area of the target object in the layer in the single-layer 3D model, and the difference threshold may be negatively correlated to the area of the target object in the layer in the single-layer 3D model. The area of the target object in the layer in the single-layer 3D model refers to the area of the target object in the single-layer 3D model. The processor may determine the area of the target object in the layer in the single-layer 3D model based on coordinates corresponding to the edge contour of the target in the single-layer 3D model using an area calculation formula or the like.

The updated illumination refers to a brightness after updating the illumination brightness of the lighting device. In some embodiments, the processor may add a predetermined luminance to the current illumination brightness as an updated illumination. The predetermined luminance may be predefined by the system or set by an individual.

The luminance adjustment instruction refers to an instruction for adjusting the illumination brightness of the lighting device. In some embodiments, the processor may generate the luminance adjustment instruction based on the updated illumination. For example, the luminance adjustment instruction generated by the processor may be: illuminating the printed physical object at the updated illumination.

In some embodiments, the processor may send the luminance adjustment instruction to the lighting device through hardware interaction.

In some embodiments of the present disclosure, in the plurality of gray regions of the single-layer 3D model, when a count of gray regions whose difference from the predicted void gray level is less than the difference threshold is greater than a predetermined quantity, it indicates that subtle imperfections that are difficult to detect may be present in the regions; by determining the updated illumination, the surface features of the printed physical object can be more clearly observed, and the visibility of these areas can be improved, helping to more accurately identify potential print voids or other defects, thereby improving printing quality.

In some embodiments, the processor may identify the target region as the void region in the printing.

Some embodiments of the present disclosure, by determining whether the target region with the pixel mean greater than the third threshold appears in the difference map, whether there is an error in the printing process can be quickly and accurately determined, which can help to continue with the next layer of the printing when there is no printing void and adjust the next layer sequence after the appearance of the void region in the printing to improve the accuracy of 3D printing.

In 250, in response to determining the presence of the void regions in the printing, void position data for the void region in the printing is obtained, and based on the void position data, the next layer is printed after adjusting the next layer sequence.

More descriptions of the next layer sequence may be found in FIG. 2 and related descriptions.

The void position data is position data of the plane where the void region in the printing is located, and the void position data may also be referred to as void plane position data. In some embodiments, the processor may determine coordinate data of the X-axis and the Y-axis of the void region in the printing in the current layer 3D model as the void position data.

In some embodiments of the present disclosure, the processor may update a print height at a position corresponding to the void position data in the next layer sequence to a sum of an initial print height and a previous layer printing height in the next layer sequence, and perform the printing of the next layer. The initial print height is a print height of the next layer in the printing path sequence before the printing path sequence is adjusted. More description of the print height and the print layer height may be found in the operation 210 of FIG. 2 and related descriptions.

Some embodiments of the present disclosure, by updating the print height at the position corresponding to the void position data in the next layer sequence to the sum of the initial print height in the next layer sequence and the print layer height of the previous layer, the print voids in the previous layer can be filled in, which can improve the 3D printing accuracy.

In 260, in response to determining that printing of the printing path sequence is completed, a 3D printed physical object is obtained.

In some embodiments, the printing of the printing path sequence is completed when the number of times the processor executes operation 220 is equal to the number of layers of the multilayer 3D model. The 3D printed physical object is a printed physical object obtained after the 3D printing is completed.

Some embodiments of the present disclosure, by layering the 3D model of the target object and designing the printing path sequence, after each layer is printed, then according to the current layer 3D model and the corresponding single-layer 3D model of the point cloud data, the inspection of the height difference, the horizontal dimension difference, and the void region in the printing is performed in turn, and according to the inspection result, timely feedback and adjustment is provided, which not only can improve the professionalism, stability and efficiency of the printing, but also can improve the similarity between the printed physical object and the target object, resulting in achieving more accurate 3D printing.

FIG. 3 is an exemplary schematic diagram illustrating a path updating model according to some embodiments of the present disclosure.

In some embodiments, in response to determining that a current layer 3D model and a single-layer 3D model satisfy an adjustment condition, the processor may determine a current layer defect feature 332 based on a current layer 3D model 311, a single-layer 3D model 312, and a historical path sequence 313 through a defect extraction layer 321 of a path updating model 320; and obtain an updated next layer 3D model 341 and an updated next layer sequence 342 based on the current layer defect feature 332 and the next layer 3D model 331 through an updating layer of the path updating model. More descriptions of the current layer 3D model, the single-layer 3D model may be found in FIG. 2 and related descriptions.

The path updating model is a model for determining how to adjust the next layer sequence. In some embodiments, the path updating model may be a machine learning model. For example, the path updating model may be a convolutional neural network model, a recurrent neural network model, or the like.

In some embodiments, the path updating model may include a defect extraction layer and an updating layer.

In some embodiments, the defect extraction layer may be configured to obtain the current layer defect feature. In some embodiments, the defect extraction layer may be a machine learning model, e.g., the defect extraction layer may be a convolutional neural network model, or the like.

In some embodiments, inputs to the defect extraction layer may include the current layer 3D model 311 and the corresponding single-layer 3D model 312 of the current layer, the historical path sequence 313, and the current layer physical map 314. More descriptions of the current layer 3D model, the single-layer 3D model, the current layer physical map, and the acquisition may be found in FIG. 2 and related descriptions.

The historical path sequence is a collection of single-layer sequences corresponding to the current layer and layers that have completed printing. In some embodiments, the processor may obtain the historical path sequence based on historical data.

In some embodiments, outputs of the defect extraction layer may include the current layer defect feature. The current layer defect feature is a feature associated with a print defect in the current layer. The current layer defect feature may include the type of defect present in the current layer and the corresponding location. The defect type may include a poor interlayer adhesion, a crack or a fracture, a shape size deviation, a surface defect, an uneven distribution of the print material, or the like.

In some embodiments, the defect extraction layer may be acquired based on training first training samples with first labels. For example, a plurality of first training samples with the first label may be input into the initial defect extraction layer, a loss function is constructed from the first label and the results of the initial defect extraction layer, and based on the loss function the initial defect extraction layer is updated by gradient descent or other method to iteratively update parameters of the initial defect extraction layer. The model training is completed when the preset iteration condition is satisfied, and a trained defect extraction layer is obtained. The predetermined iteration condition may be that the loss function converges or stabilizes, or the like.

In some embodiments, the first training sample may include a sample current layer 3D model, a sample single-layer 3D model, a sample path sequence, and a sample physical map. The sample path sequence refers to a historical path sequence as the first training sample; and the sample physical map refers to a current layer physical map as the first training sample. In some embodiments, the first training sample may be obtained based on historical data.

In some embodiments, the first label may include an actual current layer defect feature after the first training sample is printed. The first label may be captured and labeled manually.

In some embodiments, the updating layer may be configured to obtain an updated next layer 3D model and an updated next layer sequence. In some embodiments, the updating layer may be a machine learning model. For example, the updating layer may be a recurrent neural network model, or the like.

In some embodiments, inputs of the updating layer may include the next layer 3D model 331, the current layer defect feature 332, and the print device parameter 333.

The next layer 3D model is the single-layer 3D model of the next layer that needs to be printed. The processor may determine the next layer 3D model based on the multilayer 3D model and the next layer in the printing path sequence that needs to be printed after the current layer has been printed.

In some embodiments, the print device parameters may include a nozzle type, a nozzle history track, a print material thickness, a print speed, or the like. More descriptions of the print device parameter and its acquisition may be found in FIG. 2 and related descriptions.

In some embodiments, output of the updating layer may include the updated next layer 3D model as well as the updated next layer sequence.

The updated next layer 3D model is a next layer 3D model after adjusting the next layer sequence. The updated next layer sequence is the next layer sequence after adjustments. It should be noted that after adjusting the next layer sequence, when the next layer is inspected for the height difference, the horizontal dimension difference, and the void region in the printing, it is necessary to use the updated next layer 3D model to compare it with the corresponding 3D map of the next layer of the printed physical object.

In some embodiments, the updating layer may be acquired based on training the set of training samples. The training process of the updating layer is similar to the training process of the defect extraction layer, which may be seen in the relevant description in the preceding section of FIG. 3.

In some embodiments, the set of training samples may include multiple sets of training samples and the corresponding labels, wherein the multiple sets of training samples include a sample defective feature, a sample 3D model, and a sample device parameter. The sample defective feature refers to a current layer defect feature of the sample as a training sample; the sample 3D model refers to the next layer 3D model of the sample as a training sample, and the sample device parameter refers to the print device parameter of the sample as a training sample. In some embodiments, the training sample may be obtained based on historical data.

According to some embodiments of the present disclosure, the labels corresponding to the training samples may be the updated next layer 3D model and the updated next layer sequence that are actually acquired. The labels corresponding to the training samples may be obtained in various ways. For example, the updated next layer sequence may be manually labeled by a 3D printing engineer or an expert with extensive experience in 3D printing based on the difference between the current layer 3D model and the single-layer 3D model; and the updated next layer sequence based on the updated actual printed physical image of the next layer is modeled as the updated next layer 3D model in the label. As another example, the processor may collect historical data accumulated during the historical printing process and extract a valid adjusted next layer sequence as the label; and modeling the actual printed next layer physical image corresponding to the adjusted next layer path to obtain the updated next layer 3D model.

In some embodiments, the multiple sets of training samples are divided into different categories based on complexity of the target object; wherein a count of the training samples in each category is positively correlated to the complexity of the target object corresponding to the training samples.

The complexity of the target object is a print complexity of the target object. In some embodiments, the processor may determine the complexity of the target object based on a geometric complexity of the target object, a detail fineness, and the number of layers.

The geometric complexity refers to the geometry complexity of the target object, e.g., the geometric complexity may include whether the target object has complex surfaces, holes, or the like. The processor may take a picture on a surface of the target object by an image acquisition device, such as a camera, and recognize the complex curved surfaces and holes on the surface of the target object by various feasible image recognition algorithms. The processor may also perform three-dimensional modeling of the target object to identify complex surfaces and holes. For example, the more complex surfaces and holes the target object has, the higher the geometric complexity of the target object.

The detail fineness refers to a degree of print detail required for the target object, for example, the detail fineness may include small features on the surface of the target object.

In some embodiments, the processor may take images on the surface of the target object at a plurality of magnifications and from a plurality of different angles and identify the number of edges, length, and other features contained in each image through an image feature recognition algorithm such as HOG feature recognition. The more fine features on the surface of the target object, the more edges an lengths may be recognized.

In some embodiments, the detail fineness is positively correlated to the number and length of edges included in each image. For example, the processor may determine the detail fineness by the following equation: the detail fineness=$k_1*a_1+k_2*a_2+ \ldots k_n*a_n$. $k_1$ denotes a weight of a first surface image, and $a_1$ denotes a cumulative length or number of edges of the first surface image; $k_2$ denotes a weight of a second surface image, and $a_2$ denotes a cumulative length or number of edges of the second surface image; $k_n$ denotes a weight of an nth surface image, and an denotes a cumulative length or number of edges of the nth surface image. It should be noted that the weight corresponding to the cumulative length or number of edges of the surface image is positively correlated with a magnification of the corresponding surface image.

More descriptions of determination of the number of layers of the target object may be found in FIG. 2 and related descriptions.

In some embodiments, the higher the geometric complexity, the higher the detail fineness, and the higher the number of layers, the higher the corresponding complexity of the target object.

In some embodiments, the processor may categorize a training sample based on the complexity of the target object corresponding to the training sample. For example, the processor may identify training samples that rank in a top 25% of the complexity of the target object as complex samples, training samples that rank in a top 25%-75% of the complexity of the target object as medium samples, and training samples that rank in the bottom 25% of the complexity of the target object as simple samples.

In some embodiments, the higher the complexity of the target object corresponding to the training samples, the higher the number of samples of the training samples of that class. The processor may determine the number of samples of the class of training samples based on the level of the complexity of the target object corresponding to the training sample. For example, the processor may determine that the number of samples corresponding to the complex samples, the medium samples, and the simple samples is 3:2:1.

Some embodiments of the present disclosure, by categorizing the training samples of the updating layer based on the complexity of the target object and positively correlating the number of samples in each class to the complexity of the target object corresponding to that class of samples, the updating layer is enabled to learn the defective features from simple to complex and corresponding next-layer path adjustment process in the printing case, allowing the updating layer to make accurate path adjustment decisions when facing targets of different complexity, thus improving the generalizability of the model.

Some embodiments of the present disclosure, the next layer sequence is determined based on a path updating model, which can utilize the self-learning ability of the machine learning model to find patterns from a large amount of data, quickly and accurately determine the next layer sequence that better meets the printing requirements, and improve the accuracy of the 3D printed model.

Figure 4:
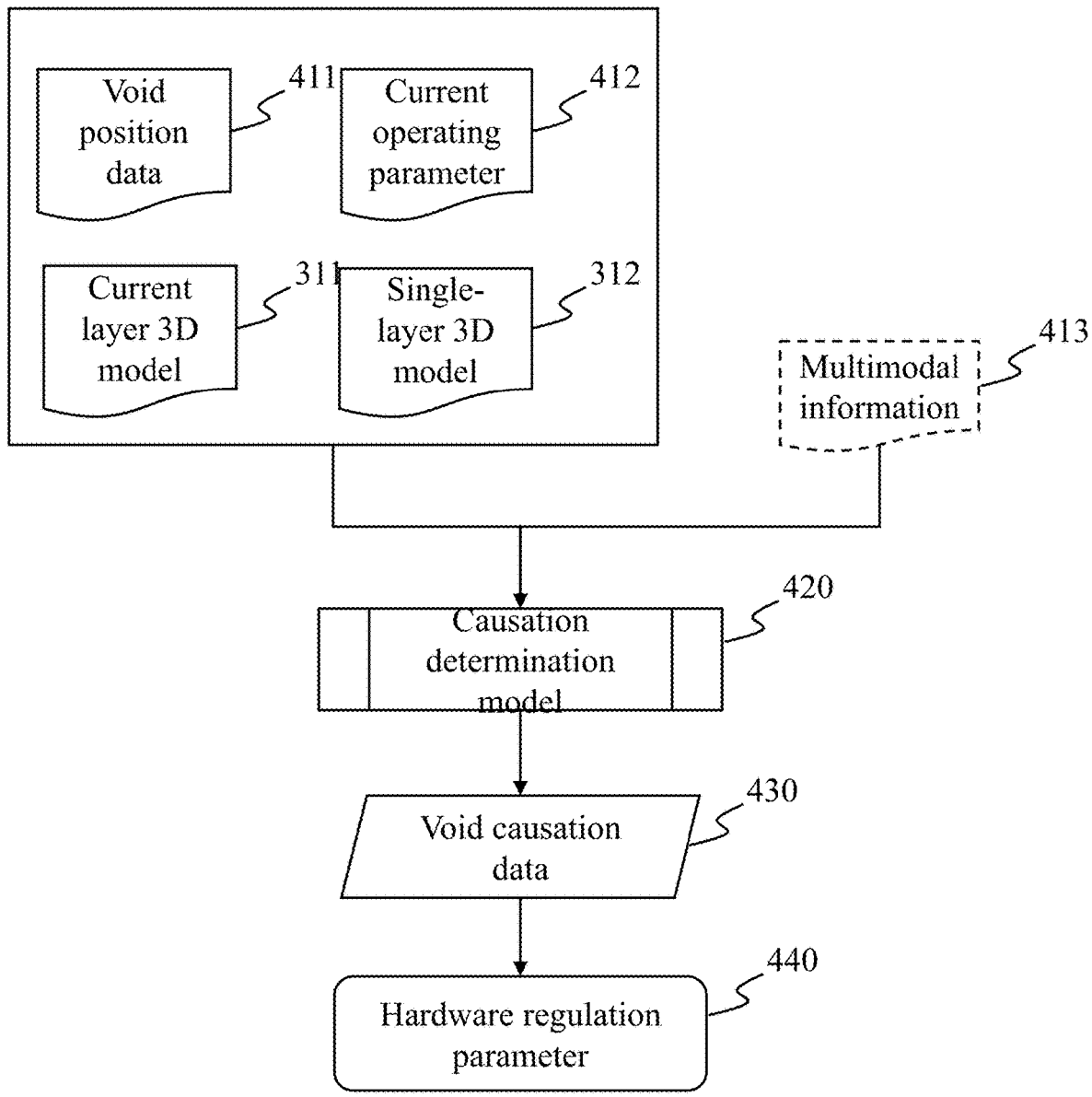
FIG. 4 is an exemplary schematic diagram illustrating a causation determination model according to some embodiments of the present disclosure.

FIG. 4 is an exemplary schematic diagram illustrating a causation determination model according to some embodiments of the present disclosure.

In some embodiments, in response to the presence of the void region in the printing, the processor may determine a hardware regulation parameter, generate hardware regulation instructions based on the hardware regulation parameter, and transmit the hardware regulation instructions to a target hardware to adjust operational parameters of the target hardware.

The hardware regulation parameter is a parameter configured to regulate the operational parameters of the hardware. The hardware refers to associated hardware of the 3D printing device. For example, the hardware may include a nozzle, a print temperature control device, a print speed control device, a feeder, or the like. For example, the nozzles may include different types of nozzles with adjustable positions. The feeder may be configured to control a feed rate of the 3D printing.

The operational parameters are parameters related to a working state of the hardware.

The hardware regulation instructions are instructions configured to regulate the operational parameters of the target hardware. The target hardware is a hardware corresponding to the hardware regulation parameter that needs to adjust the operational parameters. In some embodiments, the processor may generate the hardware regulation instruction containing the hardware regulation parameter based on the hardware regulation parameter. The processor may issue the hardware regulation parameter to the corresponding target hardware based on the hardware interaction.

In some embodiments of the present disclosure, the processor may determine void causation data 430 based on the void position data 411, current operating parameter 412, the current layer 3D model 311, and the single-layer 3D model 312 through a causation determination model 420; and determine the hardware regulation parameter 440 based on the void causation data. More descriptions of the void position data, the current layer 3D model, and the single-layer 3D model may be found in FIG. 2 and related descriptions.

The current operating parameter are a current operating parameter of the hardware. The processor may obtain the current operating parameter of the hardware by interacting with the hardware.

The causation determination model is a model for determining the void causation data. In some embodiments of the present disclosure, the causation determination model may be a machine learning model. For example, the causation determination model may be a convolutional neural network model, or the like.

In some embodiments of the present disclosure, inputs of the causation determination model may include the void position data, the current operating parameter, the current layer 3D model, and the single-layer 3D model corresponding to the current layer; and outputs of the causation determination model may be the void causation data.

The void causation data is a causation associated with formation of the void region in the printing. For example, the void causation data may include a poor nozzle condition, a print temperature deviation, a print speed deviation, a feed speed deviation, a nozzle type mismatch, and a poor material flow.

In some embodiments of the present disclosure, inputs of the causation determination model also include multimodal information 413.

The multimodal information is multimodal information related to 3D printing. For example, the multimodal information may include sound data, current illumination brightness.

The sound data is data related to sound during the 3D printing process. In some embodiments of the present disclosure, the 3D printing device may include a microphone, and the processor may determine the information collected by the microphone as the sound data.

The current illumination brightness is a brightness at which the lighting device is currently illuminating. The processor may interact directly with the lighting device to obtain the current illumination brightness.

In some embodiments of the present disclosure, the multimodal information allows for determining if there is any void causation data, such as loose hardware, insufficient lubrication, during the 3D printing process, which can lead to more accurate hardware regulation.

In some embodiments of the present disclosure, the causation determination model may be trained based on a large number of second training samples with the second label. The training of the causation determination model is similar to the training of the defect extraction layer, as can be seen in FIG. 3 and related descriptions.

In some embodiments of the present disclosure, the second training sample may include sample void data, a sample operational parameter, a sample current layer 3D model, and a sample single-layer 3D model corresponding to the sample current layer. The sample void data refers to void position data being as the second training sample. In some embodiments of the present disclosure, when the multimodal information is configured as the input to the causation determination model, the second training sample may also include sample multimodal information. The second training sample may be obtained based on historical data.

The second label may be actual void causation data corresponding to the second training sample.

The processor may determine a second label in a variety of ways. For example, the processor may determine the sample void data corresponding to the actual excluded void causation data as the second label based on historical data. As another example, the processor may conduct a simulation experiment under conditions where the void causation data exists, determine the relevant data collected by the experiment as a second training sample, and determine the actual void causation data as the second label. Exemplarily, an experiment may be conducted at a print temperature that is too low, and when a void occurs, the corresponding void position data, the current operating parameter, the current layer 3D model, and the corresponding single-layer 3D model are captured as the second training samples. The too low printing temperature may be used as the second label.

In some embodiments of the present disclosure, the processor may determine the hardware regulation parameter based on the void causation data in a variety of ways. For example, the processor may determine the hardware regulation parameter based on the void causation data by querying a preset table. The preset table may include correspondences between different void causation data and corresponding hardware regulation parameter, and the preset table may be constructed by an expert based on experience.

In some embodiments of the present disclosure, the void causation data may further include environmental factor data. The hardware regulation parameter also includes tuning parameters for the environmental hardware, and the hardware regulation instructions are further configured to send the environmental hardware to adjust environmental data for the printing environment.

The environmental factor data refers to environmental factors that contribute to the void region in the printing. For example, the environmental factor data may include poor printing environment and external environmental condition. For example, the poor printing environment may include humidity that is too low/too high, ambient temperatures that are too low/too high, or the like. The external environmental condition may include temperature, and humidity of the external environment.

In some embodiments of the present disclosure, the environmental factor data may be determined by the causation determination model.

The environmental hardware refers to hardware configured to regulate environmental data of the print environment. For example, the environmental hardware may include humidifiers, air conditioners, or the like.

In some embodiments of the present disclosure, by adjusting the humidity and temperature in the printing environment, it is possible to ensure that the print material is working in an optimal state, thereby improving the quality of the printing and reducing the number of the void region in the printing that can be caused by environmental factors.

In some embodiments of the present disclosure, by determining the void causation data by training the model to determine the hardware regulation parameter, and then regulating the operational parameters of the hardware, the stability and efficiency of the working of the hardware can be improved and more accurate printing can be achieved.

In some embodiments of the present disclosure, a three-dimensional (3D) printing method for a target object may include the following operations:

S1, a 3D model of a target object is obtained, a print planning path sequence and a multilayer 3D model of the target object are determined based on the 3D model of the target object;

S2, a height difference between a current layer printed physical object 3D model and a target object single-layer 3D model corresponding to the current layer printed physical object 3D mode are obtained, based on a current layer printing path sequence of the print planning path sequence after completing printing of a current layer, and whether the height difference exceeds a first threshold is determined; in response to determining that the height difference does not exceed the first threshold, S3 is performed;

S3, a horizontal directional dimension difference between the current layer printed physical object 3D model and the target object single-layer 3D model is obtained, and whether the horizontal directional dimension difference exceeds a second threshold is determined; in response to determining that the horizontal directional dimension difference exceeds the second threshold, the printing is stopped; in response to determining that the horizontal directional dimension difference does not exceed the second threshold, S4 is performed;

S4, a difference map of the current layer printed physical object 3D model and the target object single-layer 3D model are obtained, and based on the difference map, whether there exists a void region in the printing is determined; and in response to determining absence of the void region in the printing, S2 is performed; in response to determining presence of the void region in the printing, S5 is performed;

S5, void plane position data for the void region in the printing are obtained, and S2 is performed after adjusting the next layer printing path sequence based on the void plane position data;

When the number of times S2 is performed is equal to the number of layers of the multilayer 3D model of the target object, a 3D printed physical object is obtained. More descriptions of the three-dimensions (3D) printing method for the target object may be found in FIG. 2 and related descriptions.

In some embodiments of the present disclosure, the operation of obtaining the print planning path sequence in the S1 is specified as:

Operation 1. obtaining point cloud data of the 3D model of the target object and performing a layering process to obtain multilayer point cloud data;

Operation 2. partitioning a current layer point cloud data based on a preset print line width and a preset print coordinate origin to obtain a current layer multi-region point cloud data set;

Operation 3. connecting all single-area point cloud data of the current layer multi-region point cloud data set based on a preset single-layer printing direction to obtain an initial printing path sequence.

Operation 4: presetting a sliding window, when the sliding window traverses the initial printing path sequence, averaging point cloud data within the sliding window in an Z-axis direction as a print height, and combining the print height with the initial printing path sequence to obtain the current layer printing path sequence.

In the multilayer point cloud data, all single-layer printing path sequences obtained from all single-layer point cloud data after performing the operations 2, 3, and 4 form a multi-layer printing path sequence; based on the preset multilayer print path order, all the single-layer printing path sequences are connected to obtain the print planning path sequence. More descriptions of obtaining the print planning path sequence may be found in operation 210 of FIG. 2 and related descriptions.

In some embodiments, a flip process and a down-sampling process are performed on the point cloud data of the 3D model of the target object before the partition, and more descriptions may be found in operation 210 of FIG. 2 and related descriptions.

In some embodiments, the horizontal directional dimension difference in S3 is: differences between the maximum value along the X-axis direction, the minimum value along the X-axis direction, the maximum value along the Y-axis direction, and/or the minimum value along the Y-axis direction of the projection of the current layer printed physical object 3D model onto the two-dimensional plane and the maximum value along the X-axis direction, the minimum value along the X-axis direction, the maximum value along the Y-axis direction, the minimum value along the Y-axis direction, the maximum value along the X-axis direction, and/or the minimum value along the Y-axis direction of the projection of the corresponding target object single-layer 3D model onto the two-dimensional plane, respectively. More descriptions of the horizontal directional dimension difference may be found in operation 230 of FIG. 2 and related descriptions.

In some embodiments, the operation of determining whether there exists a void region in the printing in S4 based on the difference map is specifically as follows: obtaining a difference map of a projection of the current layer printed physical object 3D model onto a two-dimensional plane and a projection of the target object single-layer 3D model onto the two-dimensional plane; determining whether a region with a pixel mean greater than a third threshold occurs in the difference map; and in response to the presence of the region in the difference map, determining that the region is the void region in the printing; in response to the absence of the region in the difference map, determining that there is no the void region in the printing. More descriptions of determining the void region in the printing may be found in operations 240 of FIG. 2 and related descriptions.

In some embodiments, the operation of adjusting the next layer printing path sequence based on the void plane position data in S5 is specified as follows: updating a print height at a position corresponding to the void plane position data in the next layer printing path sequence to a sum of an initial print height and a previous layer printing height in the next layer printing path sequence, and performing the printing of the next layer. More descriptions of adjusting the next layer printing path sequence may be found in operation 250 of FIG. 2 and related descriptions.

In some embodiments, the operation of obtaining the current layer printed physical object 3D model in S2 is specified as: obtaining a current layer print image and a current layer print physical map; obtaining a height dataset of the current layer print physical map; and obtaining the current layer printed physical object 3D model through combining the height dataset with an edge contour map of the current layer print physical map based on corresponding positions. More descriptions of obtaining the current layer printed physical object 3D model may be found in operation 220 of FIG. 2 and related descriptions.

Some embodiments of the present disclosure further provide a 3D printing system for a target object, comprising following modules.

A print planning path sequence and target multilayer 3D model generating module is configured to obtain a 3D model of a target object, determine a print planning path sequence and a multilayer 3D model of the target object based on the 3D model of the target object;

A height difference judgment module is configured to obtain a height difference between a current layer printed physical object 3D model and a target object single-layer 3D model corresponding to the current layer printed physical object 3D mode, based on a current layer printing path sequence of the print planning path sequence after completing printing of a current layer, and determine whether the height difference exceeds a first threshold; in response to determining that the height difference does not exceed the first threshold, stop print; in response to determining that the height difference does not exceed the first threshold, execute the horizontal directional dimension difference judgment module;

A horizontal directional dimension difference judgment module is configured to obtain a horizontal directional dimension difference between the current layer printed physical object 3D model and the target object single-layer 3D model, and determine whether the horizontal directional dimension difference exceeds a second threshold; in response to determining that the horizontal directional dimension difference exceeds the second threshold, stop the printing; in response to determining that the horizontal directional dimension difference does not exceed the second threshold, execute the void region in the printing judgment module;

The void region in the printing judgment module is configured to obtain a difference map of the current layer printed physical object 3D model and the target object single-layer 3D model, and determine, based on the difference map, whether there exists a void region in the printing; and in response to determining absence of the void region in the printing, execute the height difference judgment module; in response to determining presence of the void region in the printing, execute the printing path sequence adjustment module;

The printing path sequence adjustment module is configured to obtain void plane position data for the void region in the printing, and execute the height difference judgment module after adjusting the next layer printing path sequence based on the void plane position data;

When the number of times the height difference judgment module is executed is equal to the number of layers of the multilayer 3D model of the target object, the 3D printed physical object is obtained.

Some embodiments of the present disclosure further provide a 3D printing apparatus for a target object, comprising a processor and a memory, wherein the processor implements a 3D printing method for a target object when executing a computer program stored in the memory.

Some embodiments of the present disclosure further provide a computer-readable storage medium for storing a computer program, wherein the computer program, when executed by a processor, implements a 3D printing method for a target object.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A three-dimension (3D) printing method for a target object, the method comprising:

S1, obtaining a 3D model of a target object, determining a printing path sequence and a multilayer 3D model based on the 3D model of the target object; wherein operations of obtaining the printing path sequence include: operation 1 obtaining point cloud data of the 3D model of the target object and performing a layering process to obtain multilayer point cloud data; operation 2, partitioning a current layer point cloud based on a preset print line width and a preset coordinate origin to obtain a multi-region point cloud set corresponding to the current layer; operation 3, connecting all single-area point clouds of the multi-region point cloud set based on a single-layer printing direction to obtain an initial path sequence; operation 4, presetting a sliding window, traversing the initial path sequence based on the sliding window, averaging point cloud data within the sliding window in a Z-axis direction as a print height, and combining the print height with the initial path sequence to obtain the current layer sequence; in the multilayer point cloud data, obtaining all single-layer sequences after all single-area point clouds performing the operation 2, operation 3, and operation 4 to form a multi-layer sequence; connecting the single-layer sequences based on a preset order for the multi-layer sequence to obtain the printing path sequence;

S2, obtaining a height difference between a current layer 3D model and a single-layer 3D model corresponding to the current layer 3D model, based on a current layer sequence of the printing path sequence after completing printing of a current layer, and determining whether the height difference exceeds a first threshold; in response to determining that the height difference exceeds the first threshold, stopping printing; in response to determining that the height difference does not exceed the first threshold, performing S3;

S3, obtaining a horizontal dimension difference between the current layer 3D model and the single-layer 3D model, and determining whether the horizontal dimension difference exceeds a second threshold; in response to determining that the horizontal dimension difference exceeds the second threshold, stopping the printing; in response to determining that the horizontal dimension difference does not exceed the second threshold, performing S4;

S4, obtaining a difference map of the current layer 3D model and the single-layer 3D model, and determining, based on the difference map, whether there exists a void region in the printing; and in response to determining absence of the void region in the printing, performing the S2; in response to determining the presence of the void regions in the printing, performing S5;

S5, obtaining void position data for the void region in the printing, and performing the S2 after adjusting a next layer sequence based on the void position data; and in response to determining that a count of executions of the S2 is equal to a count of layers in a multi-layer 3D model, obtaining a 3D printed physical object.

2. The 3D printing method of claim 1, wherein the method further comprises: performing a flip process and a down-sampling process on the point cloud data of the 3D model of the target object before the partition.

3. The 3D printing method of claim 1, wherein the horizontal dimension difference in the S3 is at least one of: a difference between a maximum value along an X-axis, a minimum value along the X-axis, a maximum value along an Y-axis, and/or a minimum value along the Y-axis of a projection of the current layer 3D model onto a two-dimensional plane and a maximum value along an X-axis, a minimum value along the X-axis, a maximum value along an Y-axis, and/or a minimum value along the Y-axis of a projection of the single-layer 3D model onto the two-dimensional plane, respectively.

4. The 3D printing method of claim 1, wherein the determining, based on the difference map, whether there exists the void region in the printing in the S3 includes:

obtaining a difference map of a projection of the current layer 3D model onto a two-dimensional plane and a projection of the single-layer 3D model onto the two-dimensional plane;

determining whether a target region with a pixel mean greater than a third threshold occurs in the difference map; and in response to the presence of the target region in the difference map, determining that the target region is the void region in the printing; in response to the absence of the target region in the difference map, determining that there is no the void region in the printing.

5. The 3D printing method of claim 1, wherein the adjusting the next layer sequence based on the void position data in the S5 includes:

updating a printing height at a position corresponding to the void position data in the next layer sequence to a sum of an initial printing height and a previous layer printing height in the next layer sequence, and performing the printing of the next layer.

6. The 3D printing method of claim 1, wherein the obtaining the current layer 3D model in the S2 includes:

obtaining a current layer print image and a current layer physical map;

obtaining a height dataset of the current layer physical map; and obtaining the current layer 3D model through combining the height dataset with an edge contour map of the current layer physical map based on corresponding positions.

7. A non-transitory computer-readable storage medium, wherein the non-transitory computer-readable storage medium is configured to store a computer program, when the computer program is executed by a process, the 3D printing method for a target object of claim 1 is implemented.

8. A three-dimensional (3D) printing system for a target object, the system comprises:

a generation module, configured to obtain a 3D model of a target object, determine a printing path sequence and a multilayer 3D model based on the 3D model of the target object; wherein operations of obtaining the printing path sequence include: operation 1, obtaining point cloud data of the 3D model of the target object and performing a layering process to obtain multilayer point cloud data; operation 2, partitioning a current layer point cloud based on a preset print line width and a preset coordinate origin to obtain a multi-region point cloud set corresponding to the current layer; operation 3, connecting all single-area point clouds of the multi-region point cloud set based on a single-layer printing direction to obtain an initial path sequence; operation 4, presetting a sliding window, traversing the initial path sequence based on the sliding window, averaging point cloud data within the sliding window in a Z-axis direction as a print height, and combining the print height with the initial path sequence to obtain the current layer sequence; wherein in the multilayer point cloud data, obtaining all single-layer sequences after all single-area point clouds performing the operation 2, operation 3, and operation 4 to form a multi-layer sequence; connecting the single-layer sequences based on a preset order for the multi-layer sequence to obtain the printing path sequence;

a first judgment module, configured to obtain a height difference between a current layer 3D model and a single-layer 3D model corresponding to the current layer 3D model, based on a current layer sequence of the printing path sequence after completing printing of a current layer, and determine whether the height difference exceeds a first threshold; in response to determining that the height difference exceeds the first threshold, stop printing; in response to determining that the height difference does not exceed the first threshold, perform a second judgment module;

the second judgment module, configured to obtain a horizontal dimension difference between the current layer 3D model and the single-layer 3D model, and determine whether the horizontal dimension difference exceeds a second threshold; in response to determining that the horizontal dimension difference exceeds the second threshold, stop the printing; in response to determining that the horizontal dimension difference does not exceed the second threshold, perform a third judgment module;

the third judgment module, in response to determining that the horizontal dimension difference does not exceed the second threshold, configured to: obtain a difference map of the current layer 3D model and the single-layer 3D model, and determine, based on the difference map, whether there exists a void region in the printing; and in response to determining absence of the void region in the printing, performing the first judgment module; in response to determining the presence of the void regions in the printing, perform an adjustment module;

the adjustment module, configured to obtain void position data for the void region in the printing, and perform the first judgment module after adjusting a next layer sequence based on the void position data; and the acquisition module, in response to determining that a count of executions of the first judgment module is equal to a count of layers in a multi-layer 3D model, configured to obtain a 3D printed physical object.

* * * * *